US012580274B2

(12) United States Patent
Sato et al.

(10) Patent No.: US 12,580,274 B2
(45) Date of Patent: Mar. 17, 2026

(54) LAMINATE FOR SECONDARY BATTERY AND SECONDARY BATTERY

(71) Applicant: ZEON CORPORATION, Tokyo (JP)

(72) Inventors: Masanobu Sato, Tokyo (JP); Tasuku Ogihara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 742 days.

(21) Appl. No.: 17/759,207

(22) PCT Filed: Jan. 25, 2021

(86) PCT No.: PCT/JP2021/002493
§ 371 (c)(1),
(2) Date: Jul. 21, 2022

(87) PCT Pub. No.: WO2021/153516
PCT Pub. Date: Aug. 5, 2021

(65) Prior Publication Data

US 2023/0060344 A1 Mar. 2, 2023

(30) Foreign Application Priority Data

Jan. 31, 2020 (JP) ................................ 2020-015136

(51) Int. Cl.
*H01M 50/46* (2021.01)
*H01M 4/04* (2006.01)
(Continued)

(52) U.S. Cl.
CPC ....... *H01M 50/461* (2021.01); *H01M 50/417* (2021.01); *H01M 50/489* (2021.01);
(Continued)

(58) Field of Classification Search
CPC ............. H01M 50/461; H01M 50/489; H01M 50/417; H01M 50/491; H01M 4/0404;
(Continued)

(56) References Cited

U.S. PATENT DOCUMENTS 8,377,583 B2 2/2013 Lee et al.
10,141,557 B2 11/2018 Sasaki et al.
(Continued)

FOREIGN PATENT DOCUMENTS

JP 5572101 B2 8/2014
JP 5876577 B2 3/2016
(Continued)

OTHER PUBLICATIONS

El Sakhawy et al, "Thermal Properties of Carboxymethyl cellulose acetate butyrate", Cellulose Chem. Technol., 53, (7-8), 667-675) (Year: 2019).*

(Continued)

*Primary Examiner* — Nicholas A Smith
*Assistant Examiner* — Benjamin Eli Kass-Mullet
(74) *Attorney, Agent, or Firm* — KENJA IP LAW PC

(57) ABSTRACT

A laminate for a secondary battery includes an electrode and a separator that are stacked via an adhesive material. For this laminate, when a value measured for shear peel strength between the electrode and the separator with varying temperature is taken to be A ($mN/mm^2$), a value of maximum heat shrinkage force for the separator determined by thermomechanical analysis is taken to be B ($mN/mm^2$), and a temperature at which heat shrinkage force for the separator determined by thermomechanical analysis decreases to a value ($mN/mm^2$) that is 20% higher than a value ($mN/mm^2$) of heat shrinkage force at 30° C. is taken to be a heat shrinkage end temperature $\alpha$ (° C.), A has a value satisfying A>B in a temperature range of not lower than 25° C. and not higher than the heat shrinkage end temperature $\alpha$° C.

7 Claims, 2 Drawing Sheets

(51) Int. Cl.

| | |
|---|---|
| ***H01M 4/131*** | (2010.01) |
| ***H01M 4/133*** | (2010.01) |
| ***H01M 4/66*** | (2006.01) |
| ***H01M 10/0525*** | (2010.01) |
| ***H01M 50/417*** | (2021.01) |
| ***H01M 50/489*** | (2021.01) |
| ***H01M 50/491*** | (2021.01) |

(52) U.S. Cl.
CPC ........ *H01M 4/0404* (2013.01); *H01M 4/0409* (2013.01); *H01M 4/131* (2013.01); *H01M 4/133* (2013.01); *H01M 4/661* (2013.01); *H01M 10/0525* (2013.01); *H01M 50/491* (2021.01)

(58) Field of Classification Search
CPC .... H01M 4/0409; H01M 4/131; H01M 4/133; H01M 4/661; H01M 10/0525
See application file for complete search history.

(56) References Cited

U.S. PATENT DOCUMENTS

| | | | | |
|---|---|---|---|---|
| 10,153,473 | B2 | 12/2018 | Miyazawa et al. | |
| 2006/0127753 | A1* | 6/2006 | Nakashima ......... | H01M 50/489 429/251 |
| 2015/0086852 | A1* | 3/2015 | Matsuno ........... | H01M 10/0525 429/163 |
| 2015/0162584 | A1* | 6/2015 | Uematsu ............... | H01M 4/485 429/211 |
| 2015/0333308 | A1* | 11/2015 | Toyoda ............. | H01M 10/0525 429/144 |
| 2020/0127323 | A1* | 4/2020 | Juzkow ............... | H01M 10/653 |
| 2020/0280072 | A1 | 9/2020 | Annaka et al. | |
| 2021/0036375 | A1 | 2/2021 | Sato et al. | |

FOREIGN PATENT DOCUMENTS

| | | | |
|---|---|---|---|
| JP | 2019121508 | A | 7/2019 |
| WO | 2019065130 | A1 | 4/2019 |
| WO | 2019163489 | A1 | 8/2019 |

OTHER PUBLICATIONS

Jul. 28, 2022, International Preliminary Report on Patentability issued in the International Patent Application No. PCT/JP2021/002493.

Mahmood Mohsin et al., Thermal and Mechanical Properties of Poly(vinyl alcohol) Plasticized with Glycerol, Journal of Applied Polymer Science, 2011, pp. 3102-3109, vol. 122, XP055571072.

Mar. 13, 2025, the Extended European Search Report issued by the European Patent Office in the corresponding European Patent Application No. 21747824.7.

* cited by examiner

LAMINATE FOR SECONDARY BATTERY AND SECONDARY BATTERY

TECHNICAL FIELD

The present disclosure relates to a laminate for a secondary battery and a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery typically includes battery members such as a positive electrode, a negative electrode, and a separator that isolates the positive electrode and the negative electrode from each other and prevents short circuiting between the positive and negative electrodes.

In a production process of a secondary battery, there are cases in which an electrode and a separator that have not yet been immersed in electrolyte solution are pressure bonded to obtain a laminate (hereinafter, also referred to as a "laminate for a secondary battery") and are then cut to a desired size and/or stacked, folded, or wound up, as necessary.

Laminates for secondary batteries having various structures and methods of producing such laminates have been proposed in recent years. For example, Patent Literature (PTL) 1 discloses an electrochemical device (i.e., a laminate for a secondary battery) in which a separator is bound to an electrode via a crystalline polymer. The separator includes: a porous coating layer that is formed on at least one surface of a porous substrate and that is formed of a mixture of inorganic particles and a binder polymer; and a dotted pattern layer that is formed on the surface of the porous coating layer and that is obtained through discrete arrangement of a plurality of dots formed of the crystalline polymer. As another example, PTL 2 discloses a laminate in which a separator including a specific thermoplastic polymer coating layer that coats at least one surface of a polyolefin microporous membrane is stacked with an electrode. In the specific thermoplastic polymer coating layer, a section that contains a thermoplastic polymer having at least one glass-transition temperature in a temperature region of lower than 20° C. and at least one glass-transition temperature in a temperature region of 20° C. or higher and a section that does not contain this thermoplastic polymer are present in a sea-island form.

As yet another example, PTL 3 proposes a method of efficiently producing a laminate for a secondary battery. The production method according to PTL 3 includes a step of forming an adhesive material on an affixing surface of at least one of an electrode and a separator with a formed amount that is in a specific range, a step of conveying the electrode and the separator to an affixing start position without bringing another member into contact with the affixing surface on which the adhesive material has been formed, and a step of affixing the electrode and the separator. This production method enables efficient production of a laminate for a secondary battery in which a separator and an electrode are affixed via an adhesive material.

CITATION LIST

Patent Literature

PTL 1: JP5572101B2
PTL 2: JP5876577B2
PTL 3: WO2019/163489A1

SUMMARY

Technical Problem

It is desirable for a laminate for a secondary battery to have good adhesion between an electrode and a separator in the laminate and to be capable of forming a secondary battery having low internal resistance and excellent stability. However, it has not been possible to achieve a balance of high levels of all of such attributes with laminates for secondary batteries obtained according to the conventional techniques described above.

Accordingly, one object of the present disclosure is to provide a laminate for a secondary battery that includes an electrode and a separator stacked via an adhesive material, that has excellent adhesiveness between the electrode and the separator, and that can form a secondary battery having low internal resistance and excellent stability.

Another object of the present disclosure is to provide a secondary battery that has low internal resistance and excellent stability.

Solution to Problem

The inventors conducted diligent investigation with the aim of solving the problems described above. The inventors discovered that in a situation in which, during production of a laminate for a secondary battery that includes an electrode and a separator stacked via an adhesive material, a value of the shear peel strength between the electrode and the separator is larger than a value of the maximum heat shrinkage force of the separator in a specific temperature range, it is possible to produce a laminate for a secondary battery that can achieve the object set forth above. In this manner, the inventors completed the present disclosure.

Specifically, the present disclosure aims to advantageously solve the problems set forth above, and a presently disclosed laminate for a secondary battery comprises an electrode and a separator that are stacked via an adhesive material, wherein, when a value measured for shear peel strength between the electrode and the separator with varying temperature is taken to be A, in units of $mN/mm^2$, a value of maximum heat shrinkage force for the separator determined by thermomechanical analysis is taken to be B, in units of $mN/mm^2$, and a temperature at which heat shrinkage force for the separator determined by thermomechanical analysis decreases to a value, in units of $mN/mm^2$, that is 20% higher than a value, in units of $mN/mm^2$, of heat shrinkage force at 30° C. is taken to be a heat shrinkage end temperature $\alpha$, in units of ° C., A has a value satisfying $A>B$ in a temperature range of not lower than 25° C. and not higher than the heat shrinkage end temperature $\alpha$° C. A laminate for a secondary battery that satisfies a condition of the shear peel strength A between an electrode and a separator being larger than the maximum heat shrinkage force B of the separator in a temperature range of not lower than 25° C. and not higher than the heat shrinkage end temperature $\alpha$° C. of the separator in this manner has excellent adhesiveness between the electrode and the separator and can form a secondary battery having low internal resistance and excellent stability.

Note that the "value A of shear peel strength between an electrode and a separator", "value B of maximum heat shrinkage force for a separator determined by thermomechanical analysis", and "heat shrinkage end temperature α (° C.)" can be measured in accordance with methods described in the EXAMPLES section.

In the presently disclosed laminate for a secondary battery, the separator preferably contains a polyolefin resin. When the separator contains a polyolefin resin, the internal resistance of an obtained secondary battery can be further reduced, and the stability of the secondary battery can be further increased.

In the presently disclosed laminate for a secondary battery, the adhesive material preferably contains either or both of a water-insoluble polymer that does not have a glass-transition temperature and a melting point in a temperature region of lower than 180° C. and a water-insoluble polymer that has a glass-transition temperature in a temperature region of lower than 180° C. and that has a melting point in a temperature region of 180° C. or higher. By using an adhesive material that contains either or both of a water-insoluble polymer not having a glass-transition temperature and a melting point in a temperature region of lower than 180° C. and a water-insoluble polymer having a glass-transition temperature in a temperature region of lower than 180° C. and a melting point in a temperature region of 180° C. or higher, it is possible to further increase adhesiveness between the electrode and the separator and to provide a secondary battery having even better stability.

Note that the term "water-insoluble polymer" means that when 0.5 g of the polymer is dissolved in 100 g of water at 25° C., insoluble content is 90 mass % or more. Also note that the melting point and glass-transition temperature of a water-insoluble polymer can be analyzed in accordance with JIS K7121:2012.

In the presently disclosed laminate for a secondary battery, the water-insoluble polymer is preferably a particulate polymer having a volume-average particle diameter D50, defined as a particle diameter at which cumulative volume calculated from a small diameter end in a particle diameter distribution by volume measured by dynamic light scattering reaches 50%, that is smaller than an average pore diameter of the separator. When the water-insoluble polymer is a particulate polymer having a volume-average particle diameter D50 that is smaller than the average pore diameter of the separator, adhesiveness between the electrode and the separator can be further increased.

Note that when a polymer is referred to as "particulate", this means that a particle diameter distribution thereof can be measured by dynamic light scattering. Also note that the "volume-average particle diameter D50" of a particulate polymer can be measured by a method described in the EXAMPLES section. Moreover, the average pore diameter of the separator is a number-average value of diameters measured for 1,000 randomly selected pores and can be measured by a method described in the EXAMPLES section.

In the presently disclosed laminate for a secondary battery, the adhesive material preferably contains a water-soluble polymer that has a thermal decomposition temperature of 180° C. or higher. By using an adhesive material that contains a water-soluble polymer having a thermal decomposition temperature of 180° C. or higher, it is possible to further increase adhesiveness between the electrode and the separator and to provide a secondary battery having even better stability.

Note that the term "water-soluble polymer" refers to a polymer having an insoluble content of less than 1.0 mass % when 0.5 g of the polymer is dissolved in 100 g of water at a temperature of 25° C. Also note that the "thermal decomposition temperature" of a water-soluble polymer can be measured in accordance with JIS K 7120:1987.

Moreover, the present disclosure aims to advantageously solve the problems set forth above, and a presently disclosed secondary battery comprises any one of the laminates for a secondary battery set forth above. A secondary battery that includes the presently disclosed laminate for a secondary battery has low internal resistance and excellent stability.

Advantageous Effect

According to the present disclosure, it is possible to provide a laminate for a secondary battery that has excellent adhesiveness between an electrode and a separator and that can form a secondary battery having low internal resistance and excellent stability.

Moreover, according to the present disclosure, it is possible to provide a secondary battery that has low internal resistance and excellent stability.

DETAILED DESCRIPTION

Figure 1:
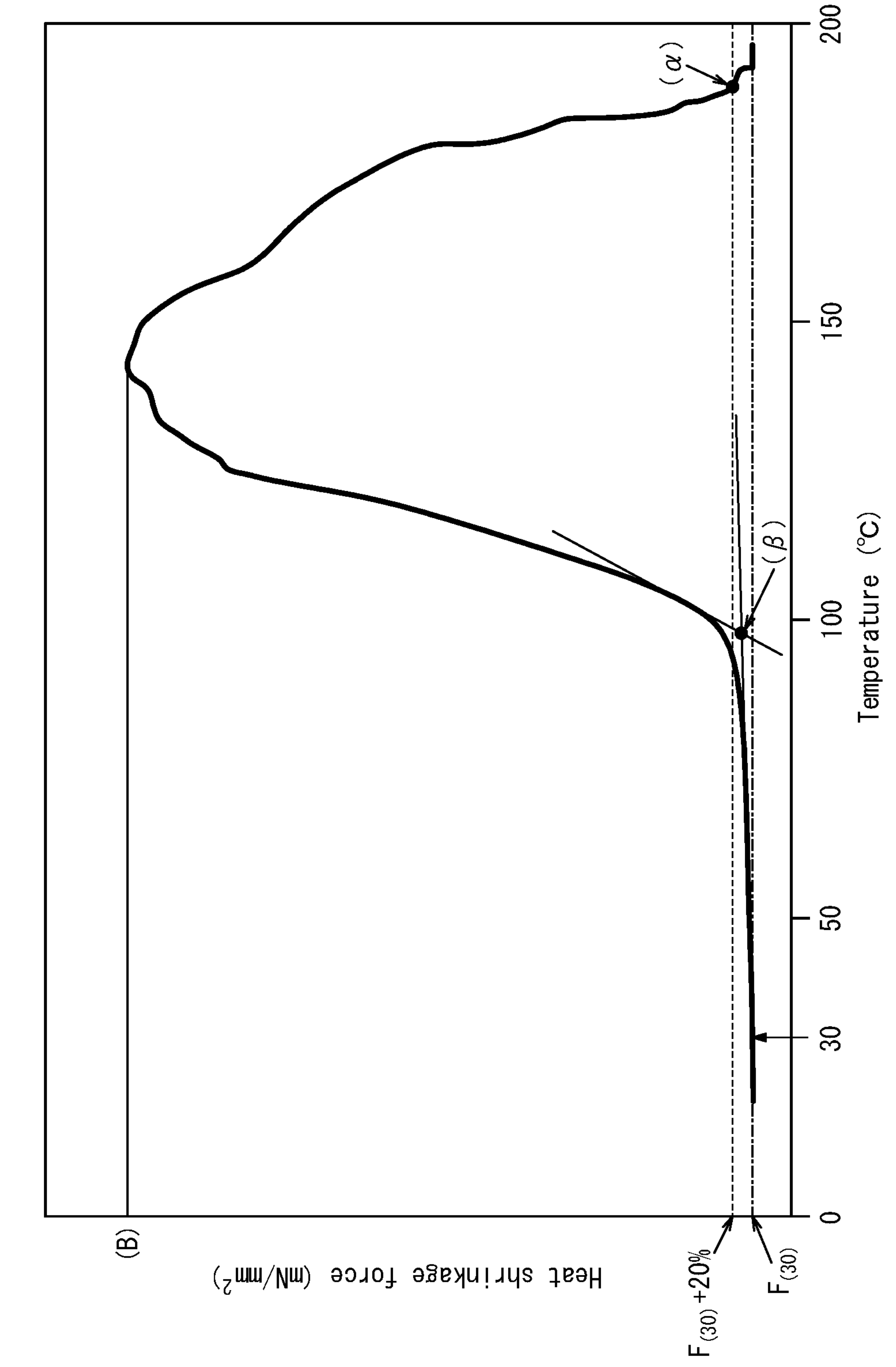
FIG. 1 illustrates a heat shrinkage curve determined by thermomechanical analysis for a separator according to one example.

The following provides a detailed description of embodiments of the present disclosure.

The presently disclosed laminate for a secondary battery can be used in production of a secondary battery such as a non-aqueous secondary battery (for example, a lithium ion secondary battery).

(Laminate for secondary battery)

The presently disclosed laminate for a secondary battery includes an electrode and a separator that are stacked via an adhesive material. In this laminate for a secondary battery, when a value measured for shear peel strength between the electrode and the separator with varying temperature is taken to be A ($mN/mm^2$), a value of maximum heat shrinkage force for the separator determined by thermomechanical analysis is taken to be B ($mN/mm^2$), and a temperature at which heat shrinkage force for the separator determined by thermomechanical analysis decreases to a value ($mN/mm^2$) that is 20% higher than a value ($mN/mm^2$) of heat shrinkage force at 30° C. is taken to be a heat shrinkage end temperature α (° C.), A is required to have a value satisfying A>B in a temperature range of not lower than 25° C. and not higher than the heat shrinkage end temperature α° C. A laminate for a secondary battery that satisfies a condition of the shear peel strength A between an electrode and a separator being larger than the maximum heat shrinkage force B of the separator in a temperature range of not lower than 25° C. and not higher than the heat shrinkage end temperature α° C. of the separator in this manner has excellent adhesiveness between the electrode and the separator and can form a secondary battery having low internal resistance and excellent stability.

Although the reason for this is not clear, it is presumed to be as follows. Firstly, the phrase "satisfying A>B in a temperature range of not lower than 25° C. and not higher than the heat shrinkage end temperature α° C." used above means that in a temperature range from room temperature to a temperature at which heat shrinkage of the separator ends (i.e., a temperature range from room temperature up until heat shrinkage force of the separator is substantially lost), the shear peel strength A between the electrode and the separator is larger than the heat shrinkage force that can at most be displayed by the separator (i.e., the maximum heat shrinkage force B of the separator). In more detail, "heat shrinkage force of the separator is substantially lost" refers to a state in which "shutdown performance through the separator" has been displayed and completed through melting and pore blocking of the separator. Accordingly, when the relationship A>B is satisfied throughout the entire "temperature range of not lower than 25° C. and not higher than the heat shrinkage end temperature α° C.", this means that adhesiveness between the electrode and the separator is maintained in a temperature region from normal temperature up until shutdown through the separator is complete. By maintaining adhesiveness between the electrode and the separator in the laminate for a secondary battery, it is possible to inhibit an increase of the internal resistance of a secondary battery that includes the laminate for a secondary battery while also inhibiting thermal runaway and increasing the stability of the secondary battery. Note that the stability of a secondary battery can, more specifically, be evaluated by a nail penetration test, an overcharge test, or the like, such as verified in the subsequently described examples. A nail penetration test can test performance in terms of inhibiting thermal runaway such as ignition or rupture when an internal short circuit is simulated in a secondary battery. Moreover, an overcharge test can test performance in terms of inhibiting thermal runaway when a secondary battery is placed in a high load state through continuous charging and discharging.

The presently disclosed laminate for a secondary battery is a laminate in which an electrode and a separator are stacked via an adhesive material. More specifically, the presently disclosed laminate for a secondary battery may be a laminate in which an electrode and a separator are affixed and joined via an affixing surface. The electrode that is affixed to the separator and is a constituent of the laminate for a secondary battery may be just a positive electrode, just a negative electrode, or both a positive electrode and a negative electrode. Moreover, in a case in which both a positive electrode and a negative electrode are affixed to a separator to obtain the laminate for a secondary battery, the number of positive electrodes, the number of negative electrodes, and the number of separators included in the laminate for a secondary battery may be 1 or may be 2 or more.

In other words, the structure of the presently disclosed laminate for a secondary battery may be any of the following structures (1) to (6).

(1) Positive electrode/Separator
(2) Negative electrode/Separator
(3) Positive electrode/Separator/Negative electrode
(4) Positive electrode/Separator/Negative electrode/Separator
(5) Separator/Positive electrode/Separator/Negative electrode
(6) Structure in which positive electrodes and negative electrodes are stacked alternately with separators in-between (for example, "separator/negative electrode/separator/positive electrode/separator/negative electrode . . . /separator/positive electrode", etc.)

<Electrode>

The electrode is not specifically limited and can, for example, be an electrode formed of an electrode substrate including an electrode mixed material layer formed on one surface or both surfaces of a current collector or an electrode further including a porous membrane layer formed on an electrode mixed material layer of an electrode substrate.

The current collector, electrode mixed material layer, and porous membrane layer are not specifically limited and can be any current collector, electrode mixed material layer, and porous membrane layer that can be used in the field of secondary batteries, such as any of those described in JP2013-145763A, for example. The porous membrane layer is a layer containing non-conductive particles such as described in JP2013-145763A, for example.

The electrode included in the presently disclosed laminate for a secondary battery preferably does not include a porous membrane layer containing non-conductive particles that can be provided mainly with the aim of increasing the heat resistance of the laminate for a secondary battery. This is because the presently disclosed laminate for a secondary battery satisfies the relationship A>B in a temperature range of not lower than 25° C. and not higher than the heat shrinkage end temperature α° C. as previously described, and thus can impart sufficient stability to an obtained secondary battery even when a porous membrane layer that can be provided mainly with the aim of increasing heat resistance of the laminate for a secondary battery is not included. The omission, from the laminate for a secondary battery, of a constituent such as a porous membrane layer that is a layer that does not directly contribute to an electrochemical reaction makes it possible to inhibit an increase of the internal resistance of an obtained secondary battery and to increase the energy density of the secondary battery.

<Separator>

The porosity of the separator included in the presently disclosed laminate for a secondary battery is preferably 5% or more, more preferably 20% or more, and even more preferably 40% or more. When the porosity of the separator is 5% or more, this enables movement, through the separator, of a substance that contributes to battery reactions, such as lithium ions, and can inhibit an excessive increase of the internal resistance of an obtained secondary battery. Note that the porosity of the separator can be 70% or less, for example, but is not specifically limited thereto. Also note that the "porosity of the separator" is a value obtained as a ratio (%) of the area of pores contained in a target region that is randomly selected in cross-sectional observation of the separator included in the laminate for a secondary battery relative to the total area of the target region.

Moreover, the average diameter of the pores of the separator (hereinafter, also referred to as the average pore diameter of the separator) is preferably not less than 100 nm and not more than 1,000 nm. Furthermore, from a viewpoint of increasing adhesiveness between the separator and the electrode, the average pore diameter of the separator is preferably larger than the volume-average particle diameter D50 of a particulate polymer serving as a subsequently described water-insoluble polymer. In this case, when the area of particulate polymer contained inside the pores of the separator is measured as a proportion relative to the total area of particulate polymer in cross-sectional observation of the laminate for a secondary battery, this proportion is preferably 10% or more. This proportion can be controlled through various adjustments of the relative ratio between the average pore diameter of the separator and the volume-average particle diameter of the particulate polymer, the heating and/or pressing conditions during affixing of the separator and the electrode, and so forth.

The separator is not specifically limited and can, for example, be a separator formed of a separator substrate or a separator including a porous membrane layer on one surface or both surfaces of a separator substrate.

The separator substrate and the porous membrane layer are not specifically limited and can be any separator substrate and porous membrane layer that can be used in the field of secondary batteries, such as any of those described in JP2012-204303A and JP2013-145763A, for example. Of these examples, those that include a separator substrate formed of a polyolefin resin such as polyethylene or polypropylene are preferable as the separator. When the separator contains a polyolefin resin, the internal resistance of an obtained secondary battery can be further reduced, and the stability of the secondary battery can be further increased.

Note that the separator included in the presently disclosed laminate for a secondary battery preferably does not include a porous membrane layer that can be provided mainly with the aim of increasing the heat resistance of the laminate for a secondary battery for the same reason as mentioned in the description in the "Electrode" section.

<Maximum Heat Shrinkage Force B of Separator>

The "value B of maximum heat shrinkage force for the separator determined by thermomechanical analysis" is a value of the maximum load (mN) per unit area ($mm^2$) of a test specimen of the separator measured through thermomechanical analysis of the test specimen.

FIG. 1 illustrates a curve (heat shrinkage curve) obtained by plotting data acquired through thermomechanical analysis of a separator according to one example with the vertical axis set as heat shrinkage force ($mN/mm^2$) and the horizontal axis set as temperature (° C.). As illustrated in FIG. 1, the maximum heat shrinkage force B of the separator is a maximum value for the value of heat shrinkage force. The heat shrinkage curve may, of course, have various different shapes depending on physical properties of the separator. However, even in a case in which the heat shrinkage curve has a plurality of local maxima, for example, the maximum value for the value of heat shrinkage force corresponds to the maximum heat shrinkage force B of the separator.

<Heat Shrinkage End Temperature $\alpha$ (° C.) of Separator>

The "heat shrinkage end temperature $\alpha$ (° C.) of the separator" is a temperature at which heat shrinkage force for the separator determined by thermomechanical analysis decreases to a value ($mN/mm^2$) that is 20% higher than a value F(30) ($mN/mm^2$) of heat shrinkage force at 30° C. as illustrated in FIG. 1. At a point corresponding to this temperature $\alpha$ (° C.), a state in which shutdown performance through the separator has been displayed and completed has been reached. In other words, at a point corresponding to the temperature $\alpha$ (° C.), a state in which the separator has melted and pores thereof have been blocked has been reached. Since the movement of substances through the separator is impeded, this suspends battery reactions and stops thermal runaway of a secondary battery. Note that shutdown performance through the separator starts at a heat shrinkage onset temperature $\beta$ illustrated in FIG. 1. The heat shrinkage onset temperature $\beta$ corresponds to an intersection point of tangents to the heat shrinkage curve before and after a point at which the gradient of a tangent to the heat shrinkage curve first significantly changes after the start of temperature increase detected in thermomechanical analysis.

The heat shrinkage onset temperature $\beta$ of the separator is preferably 100° C. or lower, more preferably 90° C. or lower, and even more preferably 70° C. or lower. When the heat shrinkage onset temperature $\beta$ of the separator is not higher than any of the upper limits set forth above, the stability of an obtained secondary battery can be further increased. More specifically, it is possible to increase performance in terms of inhibiting thermal runaway when a secondary battery is placed in a high load state through continuous charging and discharging (i.e., a characteristic that can be evaluated through an overcharge test). Note that the heat shrinkage onset temperature of the separator can be 45° C. or higher, for example.

<Peel Strength a Between Electrode and Separator>

The "value A of shear peel strength between the electrode and the separator" is a value that is obtained by measuring the tensile stress (mN) in a shear direction, at various different temperatures, for a test specimen in which the separator and the electrode are adhered via the adhesive material, and then converting the tensile stress to a value per unit area ($mm^2$). The peel strength can be adjusted based on the properties of the used adhesive material, the combination of properties of the separator, and so forth.

In the case of the presently disclosed laminate for a secondary battery, a relationship A>B is satisfied in a temperature range of not lower than 25° C. and not higher than the heat shrinkage end temperature $\alpha$° C. Therefore, in a secondary battery that includes this laminate, it is possible to inhibit thermal runaway in a temperature range up until shutdown through the separator is complete while also inhibiting an excessive increase of internal resistance.

<Adhesive Material>

The adhesive material is a material that adheres the electrode and the separator. The adhesive material may be any adhesive material that is used in the field of secondary batteries without any specific limitations so long as it can adhere the electrode and the separator and does not interfere with battery reactions. A constituent polymer of the adhesive material may be just one type of polymer or may be two or more types of polymers. In particular, the adhesive material preferably contains a water-insoluble polymer satisfying at least one of the following conditions (i) and (ii), a water-soluble polymer having a thermal decomposition temperature of 180° C. or higher, or both thereof.

<<Water-Insoluble Polymer>>

The adhesive material preferably contains either or both of (i) a water-insoluble polymer that does not have a glass-transition temperature and a melting point in a temperature region of lower than 180° C. and (ii) a water-insoluble polymer that has a glass-transition temperature in a temperature region of lower than 180° C. and that has a melting point in a temperature region of 180° C. or higher. The water-insoluble polymer corresponding to (i) preferably does not have a glass-transition temperature and a melting point in a temperature region of lower than 190° C., and more preferably does not have a glass-transition temperature and a melting point in a temperature region of lower than 200° C. Moreover, the water-insoluble polymer corresponding to (ii) preferably has a melting point in a temperature region of 190° C. or higher, and more preferably has a melting point in a temperature region of 200° C. or higher. By using an adhesive material that contains a water-soluble polymer corresponding to (i) or (ii) described above, it is possible to further increase adhesiveness between the electrode and the separator and to provide a secondary battery having even better stability.

Note that in a case in which a water-insoluble polymer used as the adhesive material is crystalline, both a glass-transition temperature and a melting point can be detected for the water-insoluble polymer. Accordingly, among water-insoluble polymers that are crystalline, those that satisfy (i) have both a glass-transition temperature and a melting point in a temperature region of 180° C. or higher. Moreover, among water-insoluble polymers that are crystalline, those that satisfy (ii) have a glass-transition temperature at lower than 180° C. and have a melting point at 180° C. or higher. On the other hand, in a case in which a water-insoluble polymer used as the adhesive material is amorphous, a glass-transition temperature is detected for the water-insoluble polymer but a melting point is not detected. Accordingly, among water-insoluble polymers that are amorphous, for those that satisfy (i), a glass-transition temperature can be detected in a temperature region of 180° C. or higher. Moreover, water-insoluble polymers that are amorphous do not satisfy (ii).

The chemical composition of the water-insoluble polymer can be any chemical composition without any specific limitations so long as the condition of being "water-insoluble" described above can be satisfied and also, more suitably, that the above described condition (i) or (ii) pertaining to glass-transition temperature and melting point can be satisfied. In particular, the water-insoluble polymer may be a binder that includes a polyfunctional ethylenically unsaturated monomer unit in a proportion of not less than 20 mass % and not more than 90 mass % (hereinafter, referred to as binder 1), a binder that includes a nitrile group-containing monomer unit in a proportion of not less than 70 mass % and not more than 95 mass % (hereinafter, referred to as binder 2), a silicone binder that is a polymer having a main chain formed of siloxane bonds, a polyamide-imide that is a polymer including an amide bond and an imide bond in a repeating unit, a fluorinated binder such as polytetrafluoroethylene, a polyamide fine particle dispersion liquid, an epoxy resin, a thermosetting urethane resin, or the like. Of these examples, the water-insoluble polymer is preferably the binder 1, binder 2, silicone binder, or fluorinated binder, more preferably the binder 1 or binder 2, and even more preferably the binder 1.

Examples of polyfunctional ethylenically unsaturated monomers that can be used to form the binder 1 (binder including a polyfunctional ethylenically unsaturated monomer unit in a proportion of not less than 20 mass % and not more than 90 mass %) include, but are not specifically limited to, polyfunctional (meth)acrylic acid ester monomers such as allyl (meth)acrylate, ethylene glycol di(meth)acrylate, diethylene glycol di(meth)acrylate, triethylene glycol di(meth)acrylate, tetraethylene glycol di(meth)acrylate, and trimethylolpropane tri(meth)acrylate;

polyfunctional aromatic vinyl monomers such as divinylbenzene and diisopropenylbenzene; and dipropylene glycol diallyl ether, polyglycol diallyl ether, triethylene glycol divinyl ether, hydroquinone diallyl ether, tetraallyloxyethane, trimethylolpropane diallyl ether, allyl or vinyl ethers of polyfunctional alcohols other than the preceding examples, triallylamine, and methylenebisacrylamide. One of these polyfunctional ethylenically unsaturated monomers may be used individually, or two or more of these polyfunctional ethylenically unsaturated monomers may be used in combination. Of these polyfunctional ethylenically unsaturated monomers, polyfunctional (meth)acrylic acid ester monomers and polyfunctional aromatic vinyl monomers are preferable, polyfunctional (meth)acrylic acid ester monomers are more preferable, ethylene glycol dimethacrylate and trimethylolpropane trimethacrylate are even more preferable, and ethylene glycol dimethacrylate is particularly preferable.

Note that "(meth)acrylate" is used to indicate "acrylate" and/or "methacrylate". No specific limitations are placed on the method by which the binder 1 is produced. The polymerization method used in production of the binder 1 may be solution polymerization, suspension polymerization, bulk polymerization, emulsion polymerization, or the like without any specific limitations. Moreover, ionic polymerization, radical polymerization, living radical polymerization, or the like may be adopted as the polymerization reaction. The polymerization may be carried out with a commonly used emulsifier, dispersant, polymerization initiator, chain transfer agent, or the like.

Examples of nitrile group-containing monomers that can be used to form the binder 2 (binder including a nitrile group-containing monomer unit in a proportion of not less than 70 mass % and not more than 95 mass %) include, but are not specifically limited to, α,β-ethylenically unsaturated nitrile monomers. Specifically, examples of α,β-ethylenically unsaturated nitrile monomers include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these α,β-ethylenically unsaturated nitrile monomers may be used individually, or two or more of these α,β-ethylenically unsaturated nitrile monomers may be used in combination. Of these α,β-ethylenically unsaturated nitrile monomers, acrylonitrile and methacrylonitrile are preferable, and acrylonitrile is more preferable. No specific limitations are placed on the method by which the binder 2 is produced, and polymerization methods and polymerization conditions such as given above as examples for the production method of the binder 1 may be adopted.

The water-insoluble polymer is preferably a particulate polymer that satisfies a specific volume-average particle diameter D50. Specifically, the volume-average particle diameter D50 of a particulate polymer serving as the water-insoluble polymer is preferably smaller than the average pore diameter of the separator that is included therewith in the laminate for a secondary battery. When the volume-average particle diameter D50 of the particulate polymer satisfies the condition set forth above, adhesiveness between the electrode and the separator can be further increased. Although the reason for this is not clear, it is presumed to be due to at least some of the particulate polymer displaying adhesive capability as an adhesive material in a state in which it has infiltrated pores of the separator, thereby increasing adhesive strength between the electrode and the separator.

The specific value of the volume-average particle diameter D50 of the particulate polymer serving as the water-insoluble polymer is preferably 100 nm or more, and more preferably 150 nm or more, and is preferably 5,000 nm or less, more preferably 3,000 nm or less, and even more preferably 2,000 nm or less. When the volume-average particle diameter D50 of the particulate polymer is in any of the ranges set forth above, adhesive force between the electrode and the separator can be further increased. Note that the volume-average particle diameter D50 of the particulate polymer can be controlled by adjusting the formulation of a monomer composition used in production of the particulate polymer and the polymerization conditions (for example, polymerization time).

Moreover, in a case in which the water-insoluble polymer is a particulate polymer, the particulate polymer may be monophase structure particles formed from a single polymer or may be heterophase structure particles formed through physical or chemical bonding of two or more different polymers. Specific examples of heterophase structures include a core-shell structure in which a central portion (core portion) and an outer shell portion (shell portion) of spherical particles are formed from different polymers; and a side-by-side structure in which two or more polymers are disposed alongside each other. Note that the term "core-shell structure" as used in the present specification is inclusive of a structure in which a shell portion completely covers the outer surface of a core portion and also a structure in which a shell portion partially covers the outer surface of a core portion. In terms of external appearance, even in a situation in which the outer surface of a core portion appears to be completely covered by a shell portion, the shell portion is still considered to be a shell portion that partially covers the outer surface of the core portion in the present disclosure so long as pores are formed that pass between inside and outside of the shell portion.

In a case in which the particulate polymer has a core-shell structure, it is preferable that, with regards to the glass-transition temperature and melting point of the core portion and the glass-transition temperature and melting point of the shell portion, at least the glass-transition temperature and melting point of the shell portion satisfy the previously described condition (i) or (ii). Moreover, it is preferable that both the glass-transition temperature and melting point of the core portion and the glass-transition temperature and melting point of the shell portion satisfy the previously described condition (i) or (ii).

<<Water-Soluble Polymer>>

The thermal decomposition temperature of the water-soluble polymer that can suitably be contained in the adhesive material is preferably 180° C. or higher, more preferably 190° C. or higher, and even more preferably 200° C. or higher. By using an adhesive material that contains a water-soluble polymer having a thermal decomposition temperature of 180° C. or higher, it is possible to further increase adhesiveness between the electrode and the separator and to provide a secondary battery having even better stability. Note that the thermal decomposition temperature of the water-soluble polymer used as the adhesive material can be 450° C. or lower, for example, but is not specifically limited thereto.

The chemical composition of the water-soluble polymer may be any chemical composition without any specific limitations so long as the condition of being "water-soluble" described above and the condition relating to the thermal decomposition temperature described above are satisfied. In particular, the water-soluble polymer may be carboxymethyl cellulose, xanthan gum, alginic acid, polyamide-imide, polyacrylamide, polyacrylic acid, polysulfonic acid, polyvinyl alcohol, polyvinylpyrrolidone, poly(2-acrylamido-2-methylpropane sulfonic acid), an aromatic amide compound, or the like. Of these examples, carboxymethyl cellulose and polyamide-imide are preferable.

<<Quantitative Ratio of Water-Insoluble Polymer and Water-Soluble Polymer in Adhesive Material>>

The adhesive material that is present between the electrode and the separator in the laminate for a secondary battery and that can adhere and join the electrode and the separator preferably contains either or both of a water-insoluble polymer and a water-soluble polymer as described above. Moreover, the adhesive material more preferably contains a water-insoluble polymer and a water-soluble polymer from a viewpoint of further increasing the injectability of electrolyte solution in formation of a secondary battery using the laminate for a secondary battery. This is presumed to be because maintaining an appropriate distance between the electrode and the separator is advantageous from a viewpoint of increasing the injectability of electrolyte solution, and thus the use of a water-insoluble polymer (particulate polymer) makes it possible to ensure this "appropriate distance" through the volume of the particulate polymer, whereas this "appropriate distance" is not ensured when the adhesive material is composed of only a water-soluble polymer. In a case in which the adhesive material contains a water-insoluble polymer and a water-soluble polymer, the content of the water-soluble polymer is preferably not less than 1 part by mass and not more than 20 parts by mass when the content of the water-insoluble polymer is taken to be 100 parts by mass.

It should be noted that although the electrode and the separator are required to be stacked via the adhesive material in the presently disclosed laminate for a secondary battery, inorganic fine particles such as fumed alumina that can infiltrate pores in the separator may also optionally be present between the electrode and the separator to the extent that the effects disclosed herein are not impaired.

(Production Method of Laminate for Secondary Battery)

The presently disclosed laminate for a secondary battery set forth above can, for example, be efficiently produced by a production method according to one example described below. The production method according to one example is a method in which the electrode and the separator are affixed to produce the laminate for a secondary battery. In the production method according to one example, the laminate for a secondary battery is produced by implementing a step (A) of applying the adhesive material at an affixing surface of at least one of the electrode and the separator, subsequently implementing a step (B) of conveying the electrode and the separator to an affixing start position without bringing another member into contact with the affixing surface at which the adhesive material has been applied, and then further implementing a step (C) of affixing the electrode and the separator to each other via the affixing surface. The term "affixing start position" refers to a position at which an affixing surface of the electrode and an affixing surface of the separator come into contact when the electrode and the separator are being affixed to each other.

<Step (A)>

In the step (A), the previously described adhesive material is applied at an affixing surface of at least one of the electrode and the separator. Note that the electrode that is used in production of the laminate for a secondary battery may be wound up in a roll form or may be pre-cut. Also note that the separator material that is used in production of the laminate for a secondary battery may be wound up in a roll form or may be pre-cut. In particular, it is preferable that the separator material is wound up in a roll form from a viewpoint of efficient continuous production of the laminate for a secondary battery. The used separator material preferably at least has a porosity of 5% or more. The porosity of the separator material is preferably 20% or more, and more preferably 40% or more. Moreover, the average diameter of pores in the separator material (hereinafter, also referred to as the average pore diameter of the separator material) is preferably not less than 100 nm and not more than 1,000 nm. Furthermore, from a viewpoint of increasing adhesiveness between the separator and the electrode, the average pore diameter of the separator material is preferably larger than the volume-average particle diameter D50 of the adhesive material. Also, from a viewpoint of increasing the energy density of an obtained secondary battery, the thickness of the used separator material is preferably 20 μm or less, and is preferably 15 μm or less. Note that the thickness of the separator material may be 4 μm or more, for example.

The adhesive material can suitably be the adhesive material that was previously described in the "Laminate for secondary battery" section. Note that the adhesive material can be supplied to the affixing surface in any state such as a solid state, a molten state, a dissolved state in a solvent, or a dispersed state in a solvent. Of these examples, it is preferable that the adhesive material is supplied in a dissolved state in a solvent or a dispersed state in a solvent.

In a case in which the adhesive material is supplied to the affixing surface in a dissolved state in a solvent or a dispersed state in a solvent in the step (A) (i.e., in a case in which a composition for adhesion containing the adhesive material and a solvent is supplied to the affixing surface), the solvent of the composition for adhesion can be water, an organic solvent, or a mixture thereof, for example, without any specific limitations. Examples of organic solvents that can be used include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, propylene glycol, and ethylene glycol monomethyl ether. Of these examples, water and alcohols are preferable as the solvent from a viewpoint of efficiently producing the laminate for a secondary battery. Note that the concentration of the adhesive material in the composition for adhesion is not specifically limited and may be not less than 1 mass % and not more than 40 mass %, for example.

Application of the adhesive material at the affixing surface can be performed by a method such as an inkjet method, a spraying method, a dispensing method, a gravure coating method, a screen printing method, or the like, for example, without any specific limitations. Of these methods, an inkjet method is preferable as the application method of the adhesive material from a viewpoint of high productivity and freedom of formation shape. The adhesive material is applied to at least one of the electrode and the separator during application of the adhesive material at the affixing surface. The electrode may be a positive electrode or may be a negative electrode.

Note that the adhesive material may be applied over the entirety of the affixing surface or may be applied at just part of the affixing surface. In a case in which the adhesive material is applied at just part of the affixing surface, the adhesive material may be applied such as to have any plan-view shape, such as a striped shape, a dotted shape, or a lattice shape without any specific limitations. Of these examples, application of the adhesive material with a dotted shape is preferable from a viewpoint of increasing the injectability of electrolyte solution in production of a secondary battery using the laminate for a secondary battery. Note that in a case in which fine dots of the adhesive material are to be arranged in a specific pattern, it is preferable that the composition for adhesion is applied in a desired pattern by an inkjet method from a viewpoint of ease of application and arrangement of the adhesive material.

<Step (B)>

In the step (B), the electrode and the separator are conveyed to an affixing start position without bringing another member into contact with the affixing surface at which the adhesive material has been applied. By not bringing another member into contact with the affixing surface at which the adhesive material has been applied in this manner, problems such as blocking do not occur, which makes it possible to use an adhesive material having excellent adhesiveness and to efficiently produce the laminate for a secondary battery.

Note that the conveying of the electrode and the separator can be performed by any conveying mechanism such as a roller, a belt conveyor, a manipulator, or a suction hand, for example, without any specific limitations. Of these examples, it is preferable that at least one of the electrode and the separator is conveyed by a roller from a viewpoint of further increasing production efficiency of the laminate for a secondary battery.

<Step (C)>

In the step (C), the electrode and the separator are affixed to each other via the affixing surface. This affixing can be performed through pressing and/or heating of a laminate in which the electrode and the separator are overlapped with the affixing surface in-between, for example, but is not specifically limited to being performed in this manner. In a case in which a composition for adhesion is used in the step (A), the time interval from completion of the step (A) to the start of the step (C) is preferably shorter than the time required for the composition for adhesion to completely dry. In other words, the composition for adhesion has preferably not completely dried at the point at which the step (C) starts. In a situation in which the step (C) can be started at a timing at which the composition for adhesion is not dried, adhesive force between the separator and the electrode can be further increased, and the stability of an obtained secondary battery can be further increased. More specifically, by causing strong adhesion between the separator and the electrode, a short-circuited section can be maintained without spreading when an internal short circuit occurs, and the stability of a secondary battery can be further increased.

Note that the pressure applied to the laminate, the temperature during affixing of the electrode and the separator, and the pressing and/or heating time of the laminate in the step (C) can be adjusted as appropriate depending on the type and amount of adhesive material that is used, for example.

(Secondary Battery)

A feature of the presently disclosed secondary battery is that it includes the presently disclosed laminate for a secondary battery. The presently disclosed secondary battery has low internal resistance and excellent stability as a result of including the presently disclosed laminate for a secondary battery. Note that in one example, production of the secondary battery using the presently disclosed laminate for a secondary battery is performed by implementing a step (assembly step) of assembling the secondary battery using the laminate for a secondary battery and an electrolyte solution.

<Assembly Step>

The electrolyte solution is normally an organic electrolyte solution obtained by dissolving a supporting electrolyte in an organic solvent. For example, a lithium salt is used as the supporting electrolyte in a case in which the secondary battery is a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of organic solvents that can be used include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The secondary battery can be assembled by further stacking an additional battery member (electrode and/or separator, etc.) with the presently disclosed laminate for a secondary battery, as necessary, subsequently performing rolling, folding, or the like of the resultant laminate in accordance with the battery shape, as necessary, to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like, for example.

EXAMPLES

The following provides a more specific description of the present disclosure based on examples. However, the present disclosure is not limited to the following examples. In the following description, "%" and "parts" used in expressing quantities are by mass, unless otherwise specified.

Measurements and evaluations of various attributes in the examples and comparative examples were performed as follows.

<Volume-Average Particle Diameter D50>

A laser diffraction particle size analyzer (produced by Shimadzu Corporation; product name: SALD-3100) was used to measure a particle diameter distribution (by volume) for a water dispersion containing a particulate polymer (water-insoluble polymer) serving as a measurement subject. In the measured particle diameter distribution, the particle diameter at which cumulative volume calculated from a small diameter end of the distribution reached 50% was taken to be the volume-average particle diameter (D50) of the particles.

<Glass-Transition Temperature (Tg) and Melting Point>

Measurement was performed in accordance with JIS K7121:2012 at a measurement temperature of −100° C. to 180° C. and a heating rate of 5° C./min using a differential scanning calorimeter (DSC6220 produced by SII NanoTechnology Inc.).

<Thermal Decomposition Temperature>

Measurement was performed in accordance with JIS K 7120:1987.

<Porosity and Average Pore Diameter of Separator>

A separator material used in production of a laminate for a secondary battery in each example or comparative example and a laminate for a secondary battery (post-injection of electrolyte solution) produced in each example or comparative example were cooled using liquid nitrogen as a cooling medium while being cut by an argon ion beam to prepare a cross-section, were observed using a scanning electron microscope (SEM), and a cross-sectional image of the laminate for a secondary battery was obtained. The obtained cross-sectional image was binarized and then a ratio (%) of the area of pores included in a randomly selected target region relative to the total area of the target region was calculated so as to determine the porosity of the separator. In addition, a circumscribed circle was set for each of 1,000 randomly selected pores in the cross-sectional image, the diameter thereof was measured, a number-average value of the diameters was determined, the average pore diameter of the separator was determined, and a judgment was made as to whether the average pore diameter of the separator satisfied a relationship of "average pore diameter of separator>volume-average particle diameter D50 of water-insoluble polymer". Note that the obtained values (porosity and average pore diameter) were the same for both the separator material and the laminate. Also note that the average pore diameter of a separator determined by this measurement was 250 nm in the case of a separator web made of polyethylene (PE) having a substrate thickness of 12 μm that was used in Example 1, etc., and was 300 nm for a separator made of polypropylene (PP) having a substrate thickness of 18 μm that was used in Example 3, etc.

<Thermomechanical Analysis of Separator Material>

Taking a separator material used in each example or comparative example as a measurement sample, a thermomechanical analyzer (TMA/SS6100 produced by SII NanoTechnology Inc.) was used to measure tensile load (mN) under the following conditions with a constant displacement mode set. The measured value for tensile load was divided by the cross-sectional area ($mm^2$) of the measurement sample to determine a value ($mN/mm^2$) for heat shrinkage force that was a value of tensile load per unit cross-sectional area.

Measurement temperature range: 20° C. up to outside range of displacement detection Heating rate: 5° C./min Measurement atmosphere: Nitrogen The value ($mN/mm^2$) of heat shrinkage force was plotted in correspondence with each temperature to obtain a heat shrinkage curve. A value ($mN/mm^2$) of maximum heat shrinkage force was taken to be the "maximum heat shrinkage force B of the separator", a temperature at which heat shrinkage force decreased to a value ($mN/mm^2$) that was 20% higher than a value $F_{(30)}$ ($mN/mm^2$) of heat shrinkage force at 30° C. was taken to be the "heat shrinkage end temperature α (° C.) of the separator", and a temperature corresponding to an intersection point of tangents to the heat shrinkage curve before and after a point at which the gradient of a tangent to the heat shrinkage curve first significantly changed after the start of temperature increase detected in thermomechanical analysis was taken to be the "heat shrinkage onset temperature β". The results are shown in Table 1.

<Shear Peel Strength>

Once time had passed after injection of electrolyte solution, a lithium ion secondary battery was disassembled, and a laminate for a secondary battery in which a negative electrode (positive electrode in Example 5) and a separator were stacked via an adhesive material was cut to a size such that the adhered area was 3 cm-square. The separator and the electrode were chucked in a shear direction, and then tensile stress was observed using an Autograph (tensing rate: 5 mm/min) inside a thermostatic tank. A peak value for initial response in the acquired data was taken to be the shear peel strength. A plot was made for test measurement temperatures of from room temperature (25° C.) to 200° C. in increments of 20° C., and the minimum value in a temperature range from room temperature to the heat shrinkage end temperature α (° C.) of the separator material used in each example or comparative example was taken to be the shear peel strength.

A: Shear peel strength of 3 $mN/mm^2$ or more

B: Shear peel strength of more than 1.3 $mN/mm^2$ and less than 3 $mN/mm^2$

C: Shear peel strength of not less than 1 $mN/mm^2$ and not more than 1.3 $mN/mm^2$ D: Shear peel strength of less than 1 $mN/mm^2$ <Adhesiveness Between Electrode and Separator>

A laminate obtained after affixing under the same conditions as in each example or comparative example (i.e., a laminate in which one electrode and one separator were affixed via an adhesive material) was sampled to obtain a test specimen.

This test specimen was placed with the surface at the current collector-side of the electrode facing downward, and cellophane tape was affixed to the surface at the current collector-side of the negative electrode (positive electrode in Example 5). Tape prescribed by JIS Z1522 was used as the cellophane tape. Moreover, the cellophane tape was fixed to a horizontal test stage in advance. The stress when the separator was peeled off by pulling one end of the separator vertically upward at a pulling speed of 50 mm/min was measured.

A total of 6 measurements were made in this manner, an average value of the stress was determined as the peel strength, and adhesiveness of the negative electrode and the separator was evaluated by the following standard. A larger peel strength indicates higher adhesiveness of the electrode (negative electrode/positive electrode) and the separator in a state in which they are not immersed in electrolyte solution (i.e., a dry state).

A: Peel strength of 1.5 N/m or more

B: Peel strength of not less than 1.0 N/m and less than 1.5 N/m

C: Peel strength of not less than 0.5 N/m and less than 1.0 N/m

D: Peel strength of less than 0.5 N/m

<Electrolyte Solution Injectability>

Electrolyte solution was injected into a lithium ion secondary battery produced in each example or comparative example. A state in which the inside of the lithium ion secondary battery was depressurized to −100 kPa was then maintained for 1 minute. Thereafter, heat sealing was performed. After 10 minutes, the electrode (negative electrode or positive electrode in Example 5) was disassembled, and the impregnation state of electrolyte solution in the electrode was visually checked. An evaluation was made by the following standard. Impregnation of a larger portion of the electrode with the electrolyte solution indicates higher electrolyte solution injectability.

A: Entire face of electrode impregnated with electrolyte solution

B: Portion of electrode equivalent to less than 5% in terms of area remains unimpregnated with electrolyte solution (excluding case in which entire face is impregnated)

C: Portion of electrode equivalent to not less than 5% and less than 10% in terms of area remains unimpregnated with electrolyte solution D: Portion of electrode equivalent to 10% or more in terms of area remains unimpregnated with electrolyte solution <Battery Thickness>

A thickness gauge (547-321 Thickness Gauge produced by Mitutoyo Corporation) was used to measure the thickness of a lithium ion secondary battery produced in each example or comparative example. This measurement was performed by randomly setting 10 measurement points in the same battery and then taking an arithmetic mean value for these measurement points to be the battery thickness.

A: Battery thickness of less than 8 mm

B: Battery thickness of 8 mm or more

<Internal Resistance>

A lithium ion secondary battery produced in each example or comparative example was charged to an SOC (State Of Charge) of 50% at 1 C (C is a value expressed by rated capacity (mA)/1 hour (h)) under conditions of 25° C. and was then subjected to 15 seconds of charging and 15 seconds of discharging centered around an SOC of 50% at each of 0.5 C, 1.0 C, 1.5 C, and 2.0 C. For each of these cases (charging side and discharging side), the battery voltage after 10 seconds was plotted against the current value, and a value obtained when the gradient of this plot was divided back by the area of the positive electrode of the lithium ion secondary battery was determined as the IV resistance ($\Omega \cdot cm^2$) (IV resistance during charging and IV resistance during discharging). The obtained IV resistance value ($\Omega \cdot cm^2$) was evaluated by the following standard. A smaller IV resistance value indicates less internal resistance and lower direct current resistance.

A: IV resistance of 22 $\Omega \cdot cm^2$ or less

B: IV resistance of more than 22 $\Omega \cdot cm^2$ and not more than 25 $\Omega \cdot cm^2$ C: IV resistance of more than 25 $\Omega \cdot cm^2$ and not more than 28 $\Omega \cdot cm^2$ D: IV resistance of more than 28 $\Omega \cdot cm^2$ <Nail Penetration Test>

A lithium ion secondary battery produced in each example or comparative example was evaluated in a nail penetration test. The nail penetration test was performed under variable temperature conditions in a thermostatic tank with a stacked lithium ion secondary battery as a test sample, and using a nail of 6 mm in diameter with an ascent/descent speed of 1 mm/min. An evaluation of "Poor" was made in a case in which thermal runaway and eventually ignition occurred after nail penetration, whereas an evaluation of "OK" was made in a case in which ignition did not occur. Five test samples were evaluated, and, in a case in which even one of these samples was evaluated as "Poor", it was judged that test sample stability cannot be maintained under that temperature condition.

A: All test samples evaluated as "OK" under temperature condition of 60° C.

B: All test samples evaluated as "OK" under temperature condition of 50° C.

C: All test samples evaluated as "OK" under temperature condition of 40° C.

D: At least one test sample evaluated as "Poor" under temperature condition of 40° C.

<Overcharge Test>

A stacked lithium ion secondary battery produced in each example or comparative example was used as a test sample in evaluation by an overcharge test. The test sample was continuously charged in a constant current mode with a variable rate, and a charging voltage upper limit of 20 V was set for test safety. Evaluations were made at various rates, and an evaluation of "Poor" was made in a case in which thermal runaway and eventually ignition occurred, whereas an evaluation of "OK" was made in a case in which ignition did not occur. Five test samples were evaluated, and, in a case in which even one of these samples was evaluated as "Poor", it was judged that test sample stability cannot be maintained under that rate condition. Note that the evaluation temperature was set as 25° C.

A: All test samples evaluated as "OK" at rate of 1.5 C

B: All test samples evaluated as "OK" at rate of 1.0 C

C: At least one test sample evaluated as "Poor" at rate of 1.0 C

Example 1

<Preparation of Adhesive Material (Binder 1)>

A mixture was obtained by loading 0.20 parts of sodium dodecyl sulfate, 0.30 parts of ammonium persulfate, and 180 parts of deionized water into a reactor A including a stirrer and mixing these materials, and was then heated to 65° C. Meanwhile, a monomer composition for seed particles was produced in a separate vessel by mixing 88.0 parts of n-butyl acrylate as a monofunctional (meth)acrylic acid ester monomer, 6.0 parts of acrylic acid as an acidic group-containing monomer, 6.0 parts of acrylonitrile as a nitrile group-containing monomer, 0.8 parts of sodium dodecyl sulfate, and 40 parts of deionized water.

This monomer composition for seed particles was continuously added into the above-described reactor A over 4 hours so as to perform a polymerization reaction. The temperature inside the reactor was maintained at 65° C. during continuous addition of the monomer composition for seed particles. Once the continuous addition was complete, the polymerization reaction was continued for a further 3 hours at 80° C. This yielded a water dispersion of seed particles. The volume-average particle diameter D50 of the seed particles was measured and was determined to be 120 nm.

Next, 16.7 parts in terms of solid content of the water dispersion of seed particles described above (composed of 14.7 parts of n-butyl acrylate units, 1 part of acrylic acid units, and 1 part of acrylonitrile units), 80.8 parts of ethylene glycol dimethacrylate (produced by Kyoeisha Chemical Co., Ltd.; product name: LIGHT ESTER EG) as a polyfunctional ethylenically unsaturated monomer, 2.5 parts of acrylic acid as an acidic group-containing monomer, 0.8 parts of sodium dodecylbenzenesulfonate, 3.2 parts of t-butyl peroxy-2-ethylhexanoate (produced by NOF Corporation; product name: PERBUTYL O) as a polymerization initiator, and 160 parts of deionized water were loaded into a reactor including a stirrer and were stirred at 35° C. for 12 hours to cause the polyfunctional ethylenically unsaturated monomer, the acidic group-containing monomer, and the polymerization initiator to be completely absorbed by the seed particles. Thereafter, the temperature inside the reactor was maintained at 90° C., and a polymerization reaction (seeded polymerization) was performed for 5 hours.

Next, unreacted monomer and initiator decomposition product were removed through introduction of steam to yield a water dispersion of a binder 1. The volume-average particle diameter D50 of the obtained binder 1 was measured as previously described. The result is shown in Table 1. Moreover, the binder 1 was confirmed to not have a glass-transition temperature and a melting point in a temperature region of lower than 180° C. as previously described.

Note that the binder 1 had a particulate form both in the water dispersion and in a dry state. Moreover, the binder 1 was confirmed to be a water-insoluble polymer having an insoluble content of 90 mass % or more when 0.5 g of polymer is dissolved in 100 g of water at 25° C.

<Production of Composition for Adhesion>

In terms of solid content, 2 parts in terms of solid content of carboxymethyl cellulose (produced by Daicel Corporation; product number: 1220) was added relative to 100 parts in terms of solid content of the water dispersion of the binder 1 (particulate polymer), and deionized water was added such that the content ratio was as indicated in Table 1. Thereafter, mixing thereof was performed at a rotation speed of 3,000 rpm for 100 minutes using an ultrahigh-speed emulsifying/dispersing device (ROBOMIX produced by PRIMIX Corporation), and then 45 parts of propylene glycol (polyhydric alcohol compound) was added as a solvent to yield a slurry-like composition for adhesion.

Note that when 0.5 g of the carboxymethyl cellulose was dissolved in 100 g of water at a temperature of 25° C., insoluble content was less than 1.0 mass %.

<Formation of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. Once the polymerization conversion rate reached 96%, cooling was performed to quench the reaction to yield a mixture containing a binder for a negative electrode mixed material layer (SBR). The mixture containing the binder for a negative electrode mixed material layer was adjusted to pH 8 through addition of 5% sodium hydroxide aqueous solution and was then subjected to thermal-vacuum distillation to remove unreacted monomer. Thereafter, cooling was performed to 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were then further mixed at 25° C. for 60 minutes. The solid content concentration was further adjusted to 62% with deionized water and then a further 15 minutes of mixing was performed at 25° C. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto copper foil of 20 μm in thickness serving as a current collector using a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode web having a negative electrode mixed material layer thickness of 80 μm.

<Formation of Positive Electrode>

A slurry composition for a secondary battery positive electrode was obtained by mixing 100 parts of $LiCoO_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent, adjusting these materials to a total solid content concentration of 70%, and mixing these materials using a planetary mixer.

The obtained slurry composition for a secondary battery positive electrode was applied onto aluminum foil of 20 μm in thickness serving as a current collector using a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The obtained positive electrode web was rolled by a roll press and was cut out to obtain a positive electrode including a positive electrode mixed material layer.

<Preparation of Separator Material>

A separator web made of polyethylene (PE) was prepared. Various attributes related to the separator material were measured as previously described. The results are shown in Table 1.

<Production of Laminate for Secondary Battery>

Figure 2:
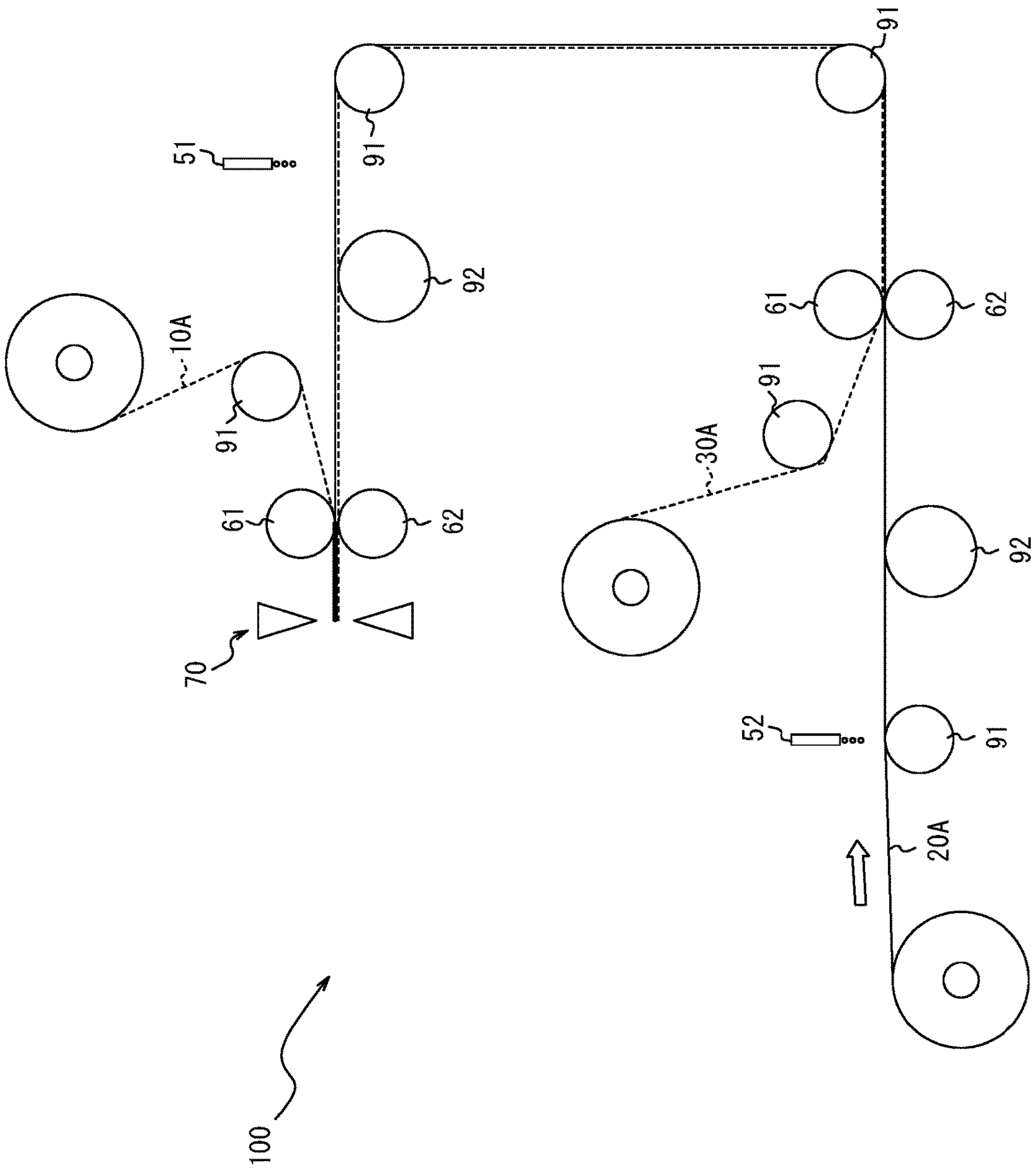
FIG. 2 is an explanatory diagram illustrating one example of schematic configuration of a production apparatus of a laminate for a secondary battery.

A laminate for a secondary battery was produced by a production apparatus 100 illustrated in FIG. 2 using the composition for adhesion, negative electrode web, and separator web that had been produced. Note that reference sign 91 in FIG. 2 indicates a conveying roller, whereas reference sign 92 in FIG. 2 indicates a heating roller.

Specifically, a negative electrode web 20A fed from a negative electrode web roll was conveyed at a speed of 10 m/min while the composition for adhesion was supplied onto one surface of the negative electrode web 20A from an inkjet head of an inkjet-type coating machine 52 (KM1024 (shear-mode type) produced by Konica) and a second separator web 30A fed from a separator web roll was affixed to the negative electrode web 20A by pressure bonding rollers 61 and 62. The composition for adhesion was also supplied onto the other surface of the negative electrode web 20A from an inkjet head of an inkjet-type coating machine 51 (KM1024 (shear-mode type) produced by Konica), and a first separator web 10A fed from a separator web roll was affixed to the laminate of the negative electrode web 20A and the second separator web 30A by pressure bonding rollers 61 and 62.

Note that conditions of affixing using the pressure bonding rollers 61 and 62 were set as conditions indicated in Table 1. Moreover, the adhesive material application shape was set as a dotted shape, and the spacing of dots was set as 200 μm in both the transverse direction (TD) and the machine direction (MD).

The first separator web/negative electrode web/second separator web laminated product that was obtained through affixing using the pressure bonding rollers 61 and 62 was cut by a cutting machine 70 to obtain a laminate for a secondary battery in which a first separator, a negative electrode, and a second separator were stacked in stated order and in which the negative electrode and the separators were adhered to one another through an adhesive material.

<Production of Secondary Battery>

A stack was obtained by stacking 20 sets of a laminate for a secondary battery obtained as described above and a positive electrode that had been cut. In this stack, there was a non-adhered state between the positive electrodes and the laminates for a secondary battery. The produced stack was enclosed in an aluminum packing case serving as a battery case, and an electrolyte solution (solvent: ethylene carbonate/diethyl carbonate/vinylene carbonate=68.5/30/1.5 (volume ratio); electrolyte: $LiPF_6$ of 1 M in concentration) was then injected. An opening of the aluminum packing case was subsequently closed by heat sealing at 150° C. to produce a stacked lithium ion secondary battery having a capacity of 8,000 mAh.

Various evaluations of this secondary battery were performed as previously described. The results are shown in Table 1.

Example 2

Various operations, measurements, and evaluations were performed in the same way as in Example 1 with the exception that a separator web made of polyethylene (PE) for which the heat shrinkage onset temperature, heat shrinkage end temperature, and maximum heat shrinkage force were as shown in Table 1 was used as a separator material. The results are shown in Table 1.

Example 3

Various operations, measurements, and evaluations were performed in the same way as in Example 1 with the exception that a separator web made of polypropylene (PP) for which the heat shrinkage onset temperature, heat shrinkage end temperature, and maximum heat shrinkage force were as shown in Table 1 was used as a separator material. The results are shown in Table 1.

Example 4

Various operations, measurements, and evaluations were performed in the same way as in Example 1 with the exception that a silicone binder (produced by Shin-Etsu Silicone; product number: KM-9729) was used as a particulate polymer (water-insoluble polymer) in the "Production of composition for adhesion" step. The results are shown in Table 1. The volume-average particle diameter D50 and the glass-transition temperature of the silicone binder were as shown in Table 1.

Note that the silicone binder had a particulate form both in water and in a dry state. Also note that the silicone binder was confirmed to be a water-insoluble polymer having an insoluble content of 90 mass % or more when 0.5 g of polymer is dissolved in 100 g of water at 25° C. Moreover, the silicone binder was confirmed to not have a glass-transition temperature and a melting point in a temperature region of lower than 180° C. as previously described.

Example 5

Polytetrafluoroethylene (LUMIFLON® FE4300 (LUMIFLON is a registered trademark in Japan, other countries, or both) produced by AGC Inc.), which is a fluorinated binder, was used as a particulate polymer (water-insoluble polymer) in the "Production of composition for adhesion" step. Moreover, in the "Formation of negative electrode" step, the negative electrode web was cut after being rolled using a roll press so as to obtain a negative electrode including a negative electrode mixed material layer. Furthermore, the positive electrode web was not cut in the "Formation of positive electrode" step. A laminate for a secondary battery was formed by using the positive electrode web instead of the negative electrode web in the "Production of laminate for secondary battery" step. In addition, the laminate for a secondary battery and the negative electrode that had been cut out in the "Formation of negative electrode" step were stacked so as to obtain a stack in the "Production of secondary battery" step.

With the exception of these points, various operations, measurements, and evaluations were performed in the same way as in Example 1. The results are shown in Table 1. The volume-average particle diameter D50 and the glass-transition temperature of the fluorinated binder were as shown in Table 1.

Note that the fluorinated binder had a particulate form both in water and in a dry state. Also note that the fluorinated binder was confirmed to be a water-insoluble polymer having an insoluble content of 90 mass % or more when 0.5 g of polymer is dissolved in 100 g of water at 25° C. Moreover, the fluorinated binder was confirmed to not have a glass-transition temperature and a melting point in a temperature region of lower than 180° C. as previously described.

Example 6

In the "Production of composition for adhesion" step, a composition for adhesion was produced without compounding the binder 1 (particulate polymer) as an adhesive material and such that the content ratios of carboxymethyl cellulose (water-soluble polymer), propylene glycol (solvent), and water (solvent) were as indicated in Table 1. With the exception of this point, various operations, measurements, and evaluations were performed in the same way as in Example 1. The results are shown in Table 1.

Example 7

In the "Production of composition for adhesion" step, a composition for adhesion was produced without compounding the binder 1 (particulate polymer) as an adhesive material and by using polyamide-imide (Torlon® AI-30 (Torlon is a registered trademark in Japan, other countries, or both) produced by Solvay) instead of carboxymethyl cellulose as a water-soluble polymer such that the content ratio thereof with propylene glycol (solvent) and water (solvent) was as indicated in Table 1. With the exception of this point, various operations, measurements, and evaluations were performed in the same way as in Example 1. The results are shown in Table 1.

Note that the polyamide-imide had an insoluble content of less than 1.0 mass % when 0.5 g of the polyamide-imide was dissolved in 100 g of water at a temperature of 25° C.

Comparative Example 1

In the "Production of composition for adhesion" step, a composition for adhesion was produced without compounding propylene glycol and using, as an adhesive material instead of the binder 1, a binder 3 that was produced as described below such that measurement results for glass-transition temperature and melting point were as shown in Table 1. Moreover, in advance of the "Production of laminate for secondary battery" step, a separator was prepared by using a gravure roll to perform entire surface application of the composition for adhesion with respect to the surface of a separator made of polyethylene (PE) as an application surface, and then performing drying and winding up thereof. Furthermore, in the "Production of laminate for secondary battery" step, the negative electrode web and the separator were affixed under conditions indicated in Table 1 using the production apparatus illustrated in FIG. 2, but without using adhesive material supply machines 51 and 52. With the exception of these points, various operations, measurements, and evaluations were performed in the same way as in Example 1. The results are shown in Table 1.

<Binder 3>

A reactor including a stirrer was supplied with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and the temperature was raised to 60° C.

Meanwhile, a monomer mixture was obtained in a separate vessel by mixing 50 parts of deionized water, 0.5 parts of sodium dodecylbenzenesulfonate as an emulsifier, 40 parts of n-butyl acrylate, 1 part of methacrylic acid, 58 parts of styrene, and 1 part of divinylbenzene. The monomer mixture was continuously added into the above-described reactor over 2 hours to perform polymerization. The reaction was carried out at 60° C. during the addition. Once the addition was complete, a further 2 hours of stirring was performed at 70° C. to complete the reaction and thereby produce a water dispersion containing a binder 3 that was a particulate polymer.

The volume-average particle diameter D50, glass-transition temperature, and melting point of the obtained binder 3 were measured. The results are shown in Table 1.

Note that the binder 3 had a particulate form both in the water dispersion and in a dry state. Also note that the binder 3 was confirmed to be a water-insoluble polymer having an insoluble content of 90 mass % or more when 0.5 g of polymer is dissolved in 100 g of water at 25° C.

Comparative Example 2

Various operations, measurements, and evaluations were performed in the same way as in Comparative Example 1 with the exception that in the "Production of laminate for secondary battery" step, a gravure coater was used to apply the composition for adhesion onto the surface of the separator with a dotted application shape. The results are shown in Table 1.

Comparative Example 3

In the "Preparation of separator material" step, a ceramic (alumina) was applied onto a separator made of polyethylene with a thickness of 5 μm per one side so as to prepare a separator web. With the exception of this point, various operations, measurements, and evaluations were performed in the same way as in Comparative Example 2. The results are shown in Table 1.

Note that Table 1 shows attributes related to the separator material prior to application of alumina.

Comparative Example 4

Various operations, measurements, and evaluations were performed in the same way as in Comparative Example 2 with the exception that the affixing conditions in the "Production of laminate for secondary battery" step were changed as indicated in Table 1 (affixing roll temperature changed to 50° C.). The results are shown in Table 1.

Comparative Example 5

Various operations, measurements, and evaluations were performed in the same way as in Comparative Example 1 with the exception that a silicone binder (produced by Shin-Etsu Silicone; product number: KM-9729) was used as an adhesive material in the "Production of composition for adhesion" step. The results are shown in Table 1.

Comparative Example 6

Various operations, measurements, and evaluations were performed in the same way as in Example 1 with the exception that the affixing conditions in the "Production of laminate for secondary battery" step were changed as indicated in Table 1 (conveyance speed changed to 2.5 m/min and time from application until affixing set as 10 seconds). The results are shown in Table 1.

Comparative Example 7

Various operations, measurements, and evaluations were performed in the same way as in Example 4 with the exception that a separator web (product name: Celgard 2500) made of polypropylene (PP) for which the heat shrinkage onset temperature, heat shrinkage end temperature, and maximum heat shrinkage force were as shown in Table 1 was used as a separator material. The results are shown in Table 1.

TABLE 1

| | | | Examples | | | | | | | Comparative examples | | | | | | |
|---|---|---|---|---|---|---|---|---|---|---|---|---|---|---|---|---|
| | | | 1 | 2 | 3 | 4 | 5 | 6 | 7 | 1 | 2 | 3 | 4 | 5 | 6 | 7 |
| Composition for adhesion | Water-insoluble polymer (particulate polymer) | Substance name | Binder 1 (EDMA/AA/BA/AN = 80.8/3.5/14.7/1) | | | Silicone binder | PTFE | — | — | Binder 3 (BA/MAA/ST/DVB = 40/1/58/1) | | | | Silicone binder | Binder 1 (EDMA/AA/BA/AN = 80.8/3.5/14.7/1) | Silicone binder |
| | | Volume-average particle diameter D50 [nm] | 200 | 200 | 200 | 2000 | 150 | — | — | 230 | 230 | 230 | 230 | 2000 | 200 | 2000 |
| | | Tg and melting point [° C.] | Not detected at <180° C. | | | | | — | — | Tg: 60° C. Melting point: Not detected at <180° C. | | | | Not detected at <180° C. | | |
| | | Content [parts by mass] | 100 | 100 | 100 | 100 | 100 | — | — | 100 | 100 | 100 | 100 | 100 | 100 | 100 |
| | Water-soluble polymer | Substance name | CMC | CMC | CMC | CMC | CMC | CMC | Polyamide-imide | CMC | CMC | CMC | CMC | CMC | CMC | CMC |
| | | Tg [° C.] | — | — | — | — | — | — | 270 | — | — | — | — | — | — | — |
| | | Thermal decomposition temperature [° C.] | 290 | 290 | 290 | 290 | 290 | 290 | 400 | 290 | 290 | 290 | 290 | 290 | 290 | 290 |
| | | Content [parts by mass] | 2 | 2 | 2 | 2 | 2 | 3 | 4 | 3 | 3 | 3 | 3 | 3 | 2 | 2 |
| | Polyhydric alcohol compound (solvent) | Type | PG | PG | PG | PG | PG | PG | PG | — | — | — | — | — | PG | PG |
| | | Content [parts by mass] | 45 | 45 | 45 | 45 | 45 | 45 | 45 | | | | | | 45 | 45 |
| | Water (solvent) | Content [parts by mass] | 900 | 900 | 900 | 900 | 900 | 900 | 900 | 500 | 500 | 500 | 500 | 500 | 900 | 900 |
| Separator material | Separator substrate material | | PE | PE | PP | PE | PE | PE | PE | PE | PE | PE | PE | PE | PE | PP |
| | Substrate thickness [μm] | | 12 | 12 | 18 | 12 | 12 | 12 | 12 | 12 | 12 | 12 | 12 | 12 | 12 | 18 |
| | Porosity [%] | | 40% | 40% | 50% | 40% | 40% | 40% | 40% | 40% | 40% | 40% | 40% | 40% | 40% | 50% |
| | Substrate TMA properties | Heat shrinkage onset temperature [° C.] | 55 | 74 | 97 | 55 | 55 | 55 | 55 | 55 | 55 | 55 | 55 | 55 | 55 | 97 |

TABLE 1-continued

| | | | Examples | | | | | | | Comparative examples | | | | | | |
|---|---|---|---|---|---|---|---|---|---|---|---|---|---|---|---|---|
| | | | 1 | 2 | 3 | 4 | 5 | 6 | 7 | 1 | 2 | 3 | 4 | 5 | 6 | 7 |
| Production conditions | | Heat shrinkage end temperature [° C.] | 140 | 152 | 185 | 140 | 140 | 140 | 140 | 140 | 140 | 140 | 140 | 140 | 140 | 185 |
| | | Maximum heat shrinkage force B [mN/mm$^2$] | 1.3 | 0.9 | 3.0 | 1.3 | 1.3 | 1.3 | 1.3 | 1.3 | 1.3 | 1.3 | 1.3 | 1.3 | 1.3 | 3.0 |
| | Ceramic coating | | No | No | No | No | No | No | No | No | No | Yes | No | No | No | No |
| | Adhesive material supply method | | | | | Inkjet | | | | | | Gravure coater | | | Inkjet | |
| | Adhesive material application site | | Negative electrode | Negative electrode | Negative electrode | Negative electrode | Positive electrode | Negative electrode | Negative electrode | Separator | Separator | Separator | Separator | Separator | Negative electrode | Negative electrode |
| | Adhesive material application shape | | Dotted shape | Dotted shape | Dotted shape | Dotted shape | Dotted shape | Dotted shape | Dotted shape | Entire surface | Dotted shape | Dotted shape | Dotted shape | Entire surface | Dotted shape | Dotted shape |
| | Affixing conditions | Time from application until affixing [s] | 2.5 | 2.5 | 2.5 | 2.5 | 2.5 | 2.5 | 2.5 | — | — | — | — | — | 10 | 2.5 |
| | | Pressure during affixing [MPa] | 1 | 1 | 1 | 1 | 1 | 1 | 1 | 1 | 1 | 1 | 1 | 1 | 1 | 1 |
| | | Affixing roll temperature [° C.] | 30 | 30 | 30 | 30 | 30 | 30 | 30 | 80 | 80 | 80 | 50 | 80 | 30 | 30 |
| Laminate | Value A of shear peel strength | | A | A | A | B | B | A | A | D | D | D | D | D | C | C |
| | A > B in range of 25° C. to α ° C. | | Yes | Yes | Yes | Yes | Yes | Yes | Yes | No | No | No | No | No | No | No |
| | Average pore diameter of separator > Volume-average particle diameter D50 of water-insoluble polymer | | Yes | Yes | Yes | No | Yes | — | — | Yes | Yes | Yes | Yes | No | Yes | No |
| Evaluation | Adhesiveness between electrode and separator | | A | A | A | B | B | A | A | A | A | A | D | D | C | B |
| | Electrolyte solution injectability | | A | A | A | A | A | B | B | D | B | B | B | C | A | A |
| | Battery thickness | | A | A | B | A | A | A | A | A | A | B | A | A | A | B |

TABLE 1-continued

| | Examples | | | | | | | Comparative examples | | | | | | |
|---|---|---|---|---|---|---|---|---|---|---|---|---|---|---|
| | 1 | 2 | 3 | 4 | 5 | 6 | 7 | 1 | 2 | 3 | 4 | 5 | 6 | 7 |
| Internal resistance | A | A | A | A | A | A | A | C | B | C | A | C | A | A |
| Nail penetration test | A | A | A | A | A | A | A | C | C | A | D | D | C | B |
| Overcharge test | A | B | C | A | A | A | A | A | A | C | A | A | A | C |

In Table 1:
"Tg" indicates glass-transition temperature;
"EDMA" indicates ethylene glycol dimethacrylate;
"AA" indicates acrylic acid;
"BA" indicates n-butyl acrylate;
"AN" indicates acrylonitrile;
"PTFE" indicates polytetrafluoroethylene;
"CMC" indicates carboxymethyl cellulose;
"PG" indicates propylene glycol;
"PE" indicates polyethylene;
"PP" indicates polypropylene;
"MAA" indicates methacrylic acid;
"ST" indicates styrene; and
"DVB" indicates divinylbenzene.

It can be seen from Table 1 that in Examples 1 to 7, it was possible to produce a laminate for a secondary battery that had excellent adhesiveness between an electrode and a separator and that could form a secondary battery having low internal resistance and excellent stability. In contrast, it can be seen from Table 1 that in Comparative Examples 1 to 7, it was not possible to produce a laminate for a secondary battery that enabled a balance of high levels of all of the attributes described above.

INDUSTRIAL APPLICABILITY

According to the present disclosure, it is possible to provide a laminate for a secondary battery that has excellent adhesiveness between an electrode and a separator and that can form a secondary battery having low internal resistance and excellent stability.

Moreover, according to the present disclosure, it is possible to provide a secondary battery that has low internal resistance and excellent stability.

REFERENCE SIGNS LIST

10A first separator web
20A negative electrode web
30A second separator web
51, 52 coating machine
61, 62 pressure bonding roller
70 cutting machine
91 conveying roller
92 heating roller
100 production apparatus

The invention claimed is:

1. A laminate for a secondary battery comprising an electrode and a separator that are stacked via an adhesive material, wherein, when a value measured for shear peel strength between the electrode and the separator with varying temperature is taken to be A, in units of $mN/mm^2$, a value of maximum heat shrinkage force for the separator determined by thermomechanical analysis is taken to be B, in units of $mN/mm^2$, and a temperature at which heat shrinkage force for the separator determined by thermomechanical analysis decreases to a value X, in units of $mN/mm^2$, that is 20% higher than a value Y, in units of $mN/mm^2$, of heat shrinkage force at 30° C. is taken to be a heat shrinkage end temperature α, in units of ° C., A has a value satisfying A>B throughout an entire temperature range of not lower than 25° C. and not higher than the heat shrinkage end temperature α° C., wherein the shear peel strength is measured by using autograph and determined by data plotting in the range between 25° C. and 200° C., the heat shrinkage force is determined by using a thermomechanical analyzer so as to obtain data set of tensile load (mN) corresponding to each temperature from 20° C. up to outside range of displacement detection, dividing the tensile load (mN) by a cross-sectional area ($mm^2$) of a measurement sample, and plotting values of heat shrinkage force ($mN/mm^2$) so as to determine a maximum heat shrinkage force as the heat shrinkage force.

2. The laminate for a secondary battery according to claim 1, wherein the separator contains a polyolefin resin.

3. The laminate for a secondary battery according to claim 1, wherein the adhesive material contains either or both of a water-insoluble polymer that does not have a glass-transition temperature and a melting point in a temperature region of lower than 180° C. and a water-insoluble polymer that has a glass-transition temperature in a temperature region of lower than 180° C. and that has a melting point in a temperature region of 180° C. or higher.

4. The laminate for a secondary battery according to claim 3, wherein the water-insoluble polymer is a particulate polymer having a volume-average particle diameter D50, defined as a particle diameter at which cumulative volume calculated from a small diameter end in a particle diameter distribution by volume measured by dynamic light scattering reaches 50%, that is smaller than an average pore diameter of the separator.

5. The laminate for a secondary battery according to claim 1, wherein the adhesive material contains a water-soluble polymer that has a thermal decomposition temperature of 180° C. or higher.

6. A secondary battery comprising the laminate for a secondary battery according to claim 1.

7. The laminate for a secondary battery according to claim 1, wherein the adhesive material is arranged in a pattern.

* * * * *